United States Patent [19]

Wuebbels et al.

[11] Patent Number: 5,749,208
[45] Date of Patent: May 12, 1998

[54] MOWING APPARATUS

[75] Inventors: Richard Wuebbels, Borken; Alfons Resing, Stadtlohn, both of Germany

[73] Assignee: Maschinenfabrik Kemper GmbH, Stadtlohn, Germany

[21] Appl. No.: 720,283

[22] Filed: Sep. 26, 1996

[30] Foreign Application Priority Data

Sep. 30, 1995 [DE] Germany ................ 295 15 634.1

[51] Int. Cl.[6] .................................................. A01D 34/76
[52] U.S. Cl. ..................... 56/10.3; 56/11.3; 56/11.8; 56/60; 56/DIG. 4; 56/6
[58] Field of Search ...................... 56/6, 10.3, 10.4, 56/11.3, 11.7, 11.8, 16.7, 53, 60, DIG. 4, DIG. 6

[56] References Cited

U.S. PATENT DOCUMENTS

| 4,282,702 | 8/1981 | McBee | 56/10.3 |
| 4,924,988 | 5/1990 | Page | 56/11.3 X |
| 5,033,595 | 7/1991 | Pardee | 56/11.3 X |
| 5,237,804 | 8/1993 | Bertling | 56/60 |
| 5,570,765 | 11/1996 | Partridge | 56/11.3 X |

FOREIGN PATENT DOCUMENTS 3203790  12/1982  Germany ................ 56/11.3

*Primary Examiner*—Terry Lee Melius
*Attorney, Agent, or Firm*—Jordan and Hamburg

[57] ABSTRACT

The mowing implement of a mowing apparatus, rotating about a vertical axis, is driven over a transmission comprising a freewheel mechanism and driving pins. A drive shaft is connected with the freewheel mechanism so that there cannot be any mutual rotation therebetween. In a basic orientation parallel to the axis of rotation of the mowing implement, these driving pins produce a driving connection between the freewheel mechanism and the mowing implement for driving the latter. In the event of a stoppage of the drive shaft, the driving pins, together with the freewheel mechanism, carry out a lifting motion, which interrupts the driving connection between the mowing implement and the freewheel mechanism. During their lifting motion, the driving pins activate a braking device in the region of the interior of the transmission housing above the freewheel mechanism. This braking device rapidly brings the mowing implement, which continues to run, to a stop.

14 Claims, 5 Drawing Sheets

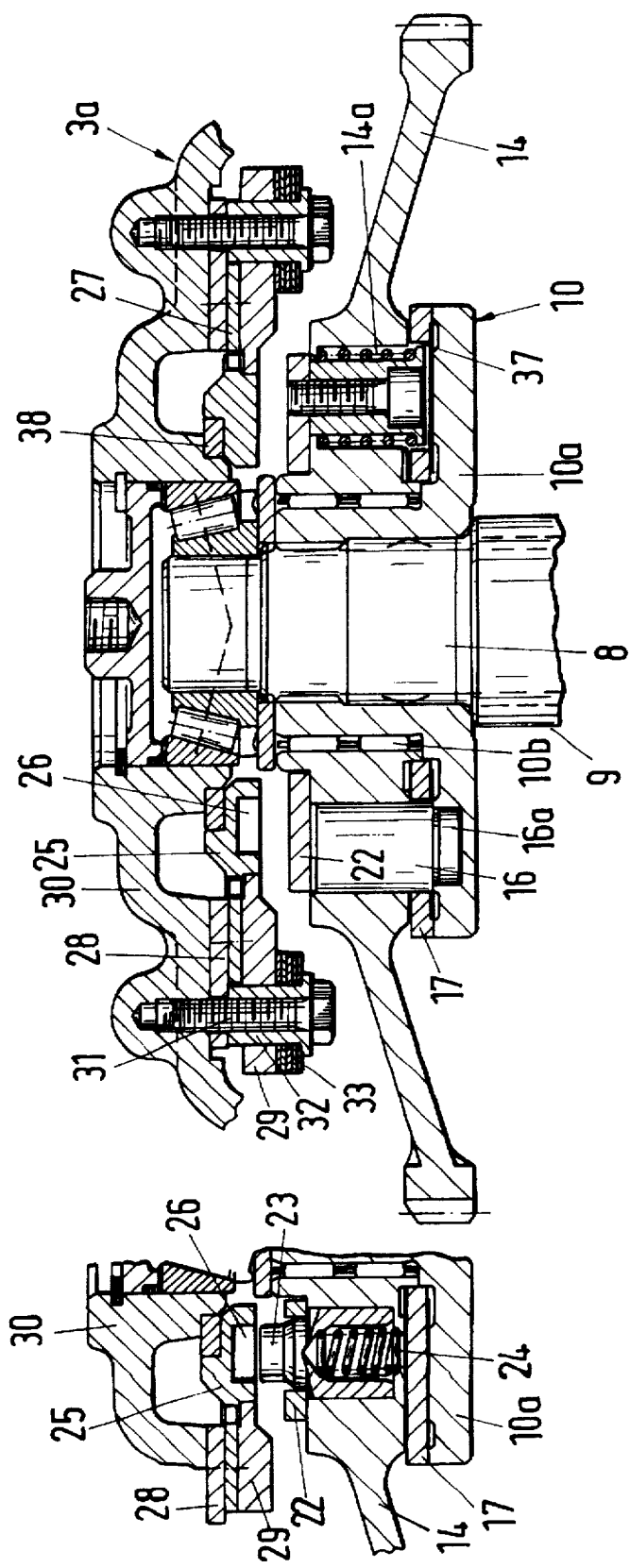

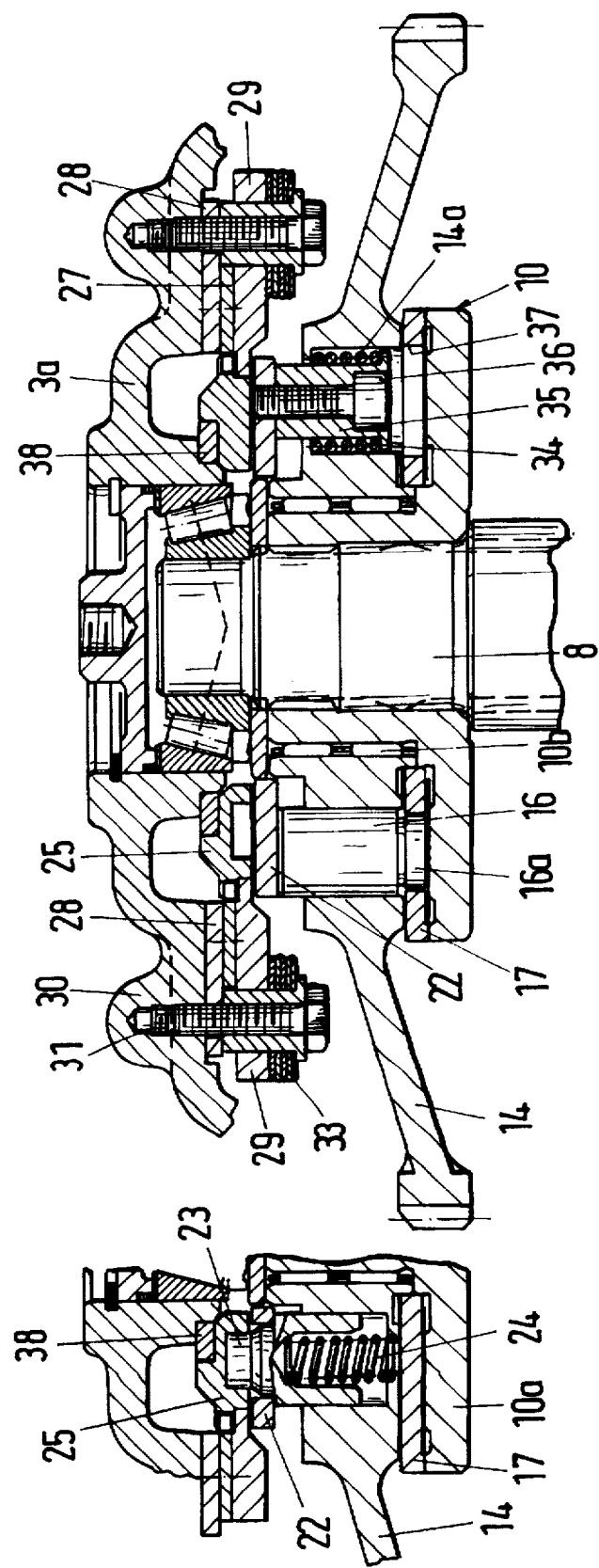

MOWING APPARATUS

BACKGROUND OF THE INVENTION

The invention relates to a mowing apparatus with a mowing implement, which rotates about a vertical axis and can be driven over a transmission, comprising a freewheel mechanism, by a drive shaft, connected with the freewheel mechanism so that there cannot be any mutual rotation, over driving pins which, in a basic orientation parallel to the axis of rotation of the mowing implement, bring about a driving connection between the freewheel mechanism and the mowing implement for the purpose of driving the latter and, in the event of a stoppage of the drive shaft, carry out a lifting motion together with the freewheel mechanism, which lifting motion interrupts the driving connection between the mowing implement and the freewheel mechanism.

Such mowing apparatuses are used for mowing stalk-like harvested crops in mowing machines with usually at least two such mowing apparatuses as self-propelled vehicles or also as attachment for a tractor. The latter may furthermore comprise a chopper for chopping whole-plant silage, especially such as corn. For such harvested crops, mowing apparatuses are in use, which are combined with drawing-in drums, which supply the harvested products, cut with the mowing implements, to the chopper. An example of such mowing apparatus is disclosed in co-pending U.S. patent application filed Aug. 22, 1996 (Attorney Docket No. F-5379) and which is assigned to the assignee of this instant application, the title of which is "Machine for Mowing and Chopping Corn and Similar Stalk-Like Harvested Crops Independently of the Row" and the disclosure of which is incorporated herein by reference.

Whereas the drawing-in drums rotate at a low peripheral speed and therefore, when the machine is switched off and consequently the operating connection is interrupted, come to a stop in a short time, the mowing implements of the mowing apparatuses, in the form of circular knives or serrated rotors, have very high rotational speeds, which may amount, for example, to 500 to 1,500 rpm, depending on the size of the rotors. If the driving shaft of the mowing implement is brought to a stop, for example, by cutting off the tractor gas during a back-up in the conveying of the harvested crops, the centrifugal mass of the rapidly running mowing equipment causes a relatively long run-on of, for example, 30 to 150 seconds, depending on the size of the mowing equipment This can cause cutting injuries when the mowing apparatuses are approached.

In order to avoid this, braking devices, which are actuated hydraulically or electrically, have already become known in conjunction with mowing apparatuses and centrifugal mowing equipment. For this purpose, separate, external sources of power and electrical or hydraulic circuits are required which complicate the mowing apparatus and, in rough agricultural harvesting operations, are extremely susceptible to breakdowns.

SUMMARY OF THE INVENTION

It is therefore an object of the invention to construct a mowing apparatus of the initially given type in such a manner, that braking of the mowing equipment is achieved without the help of external driving mechanisms and sources of power, solely by mechanical means with a high degree of reliability.

Pursuant to the invention, this objective is accomplished in principle owing to the fact that the lifting motion, which is carried out by the driving pins, when the drive shaft is stopped, in order to interrupt the driving connection between the freewheel mechanism and the mowing implement, is used to activate a braking device which, pursuant to the invention, is formed in the region of the inside of the transmission housing above the freewheel mechanism. This is accomplished owing to the fact that, on the upper side of the driving pins, a ring-shaped pressure plate is disposed which, during the lifting motion of the driving pin, works against the braking device on the inside of the transmission housing.

The braking force, which is exerted by the braking device on the inside of the transmission housing on a driving gearwheel of the mowing equipment or on a driver part, which rotates together with this gearwheel and carries a suitable brake disk, preferably is elastically adjustable for applying different braking torques, which correspond to the braking conditions. For this purpose, a pressure, which determines the frictional resistance for the brake disk and, with that the braking action, can be produced under spring load between two horizontal brake counter-disks on the housing side, between which the brake disk is accommodated in a gap. Instead of horizontal brake counter-disks on the housing side, between which the braking disk is accommodated, it is also conceivable to provide an embodiment, for which the braking disk rotates over an appropriate driving device in one peripheral plane with the driving gearwheel for the mowing equipment and works against a braking counter-surface at the inner periphery of the transmission housing. In this case also, the braking force preferably is adjustable elastically in an appropriate manner.

The connection between the pressure plate and the braking device is brought about in an advantageous, further development of the invention over vertical shift pins, which are disposed at a distance from one another in the peripheral direction and which are held in the pressure plate elastically tensioned in the direction of the braking device, that is, upwards. To carry out a braking process, the shift pin engages elongated holes, extending in the peripheral direction, of the driving device holding the brake disk.

For uniform braking within a short time, which can bring the mowing equipment, which is running on after being detached from the driving connection, to a stop in about 5 seconds or, in the case of larger mowing equipment, also within about 20 seconds, a locking disk is disposed preferably on the horizontal upper side of the ring disk part of the freewheel mechanism, which locking disk, when the driving pins assume their braking position, stops the driving pins of the freewheel mechanism at the end of their upwards-directed lifting motion, which sets in when the drive shaft is being stopped. The transmission parts above the horizontal ring disk of the freewheel mechanism, running on with the driving gearwheel for the mowing equipment because of the centrifugal mass of the latter, thus rotate without change in their plane of rotation and, in this way, achieve a uniform braking effect of the also rotating braking disk at the brake counter-device fastened to the housing.

Further distinguishing features and advantages of the invention arise out of the description and drawing below, in which a preferred embodiment of the object of the invention is shown diagrammatically.

3

Figure 3:
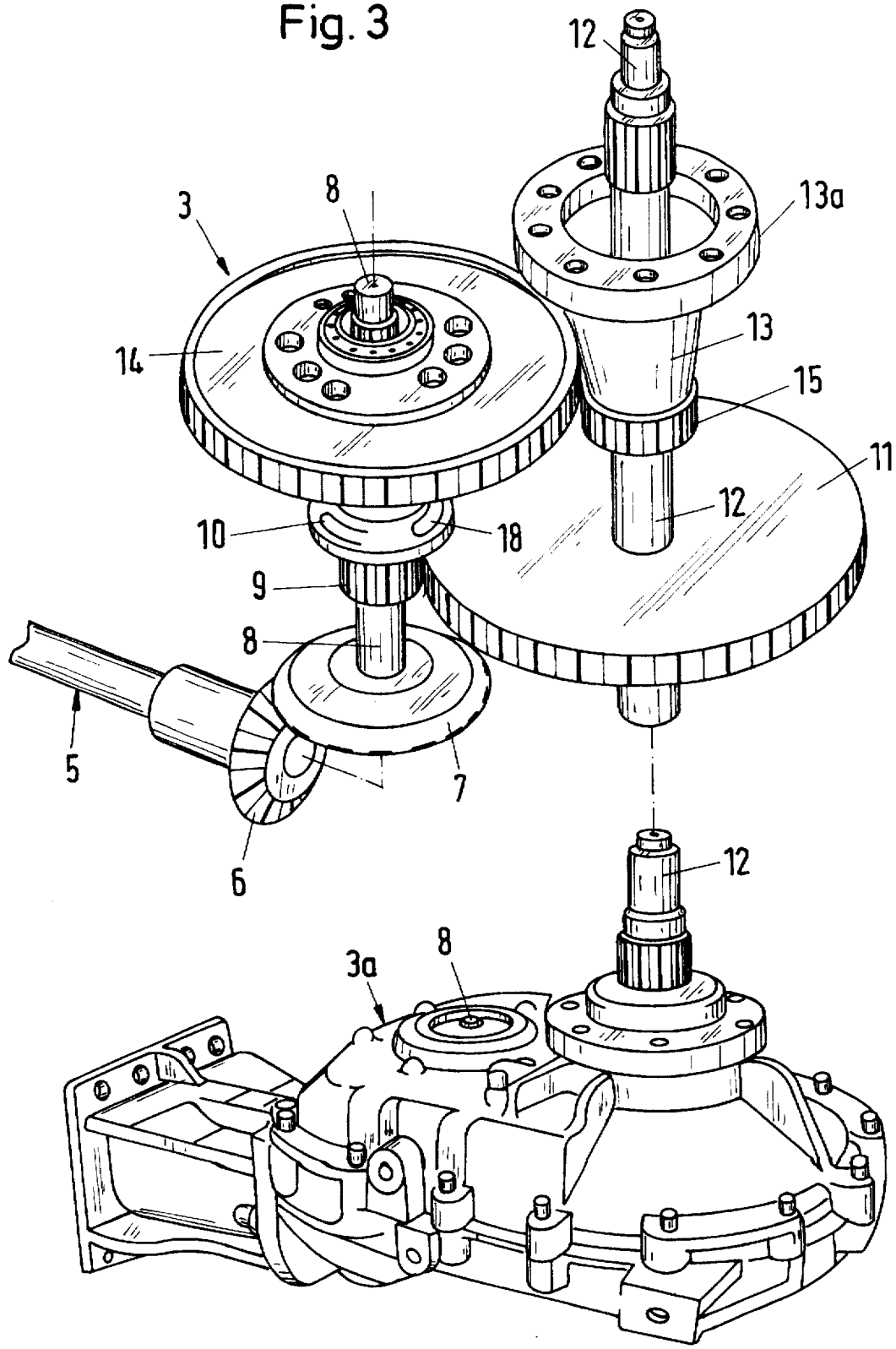

FIG. 3 in its lower part, shows a perspective overall view of the transmission for the mowing equipment and, in its upper part, shows on an enlarged scale a perspective representation of the transmission parts set in the transmission housing.

Figure 4:
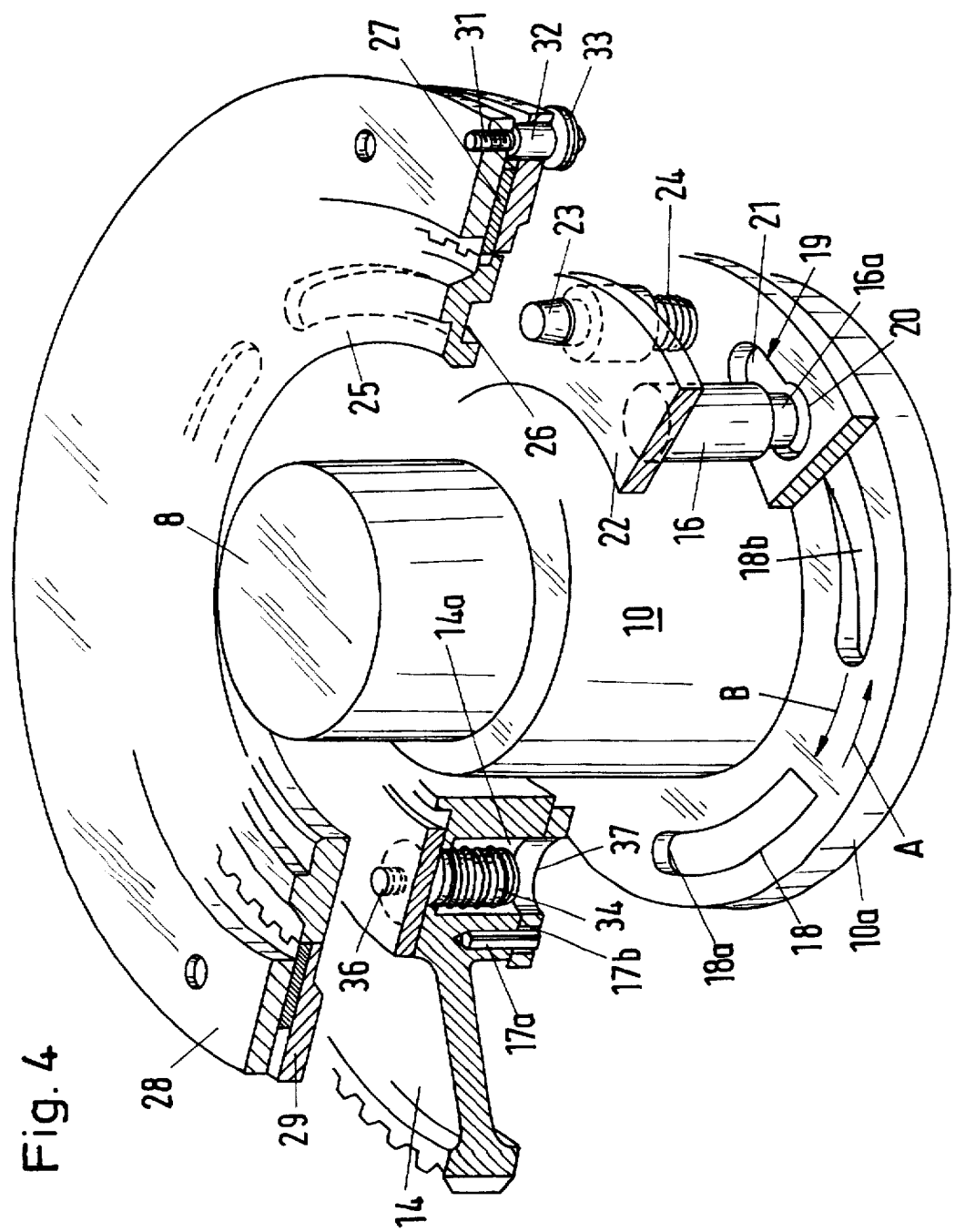

FIG. 4 shows a perspective representation of the freewheel mechanism with the braking device with parts partially cut away, FIG. 5 shows a vertical section through the arrangement of FIG. 4, the driving pins of the freewheel mechanism being in the driving connection, FIG. 6 shows a vertical section corresponding to FIG. 5 and limited to a detail, and FIG. 7 and 8 show sectional representations of FIGS. 5 and 6 respectfully, the driving pins of the freewheel mechanism, however, being in their braking position.

DESCRIPTION OF THE PREFERRED EMBODIMENT

Figure 1:
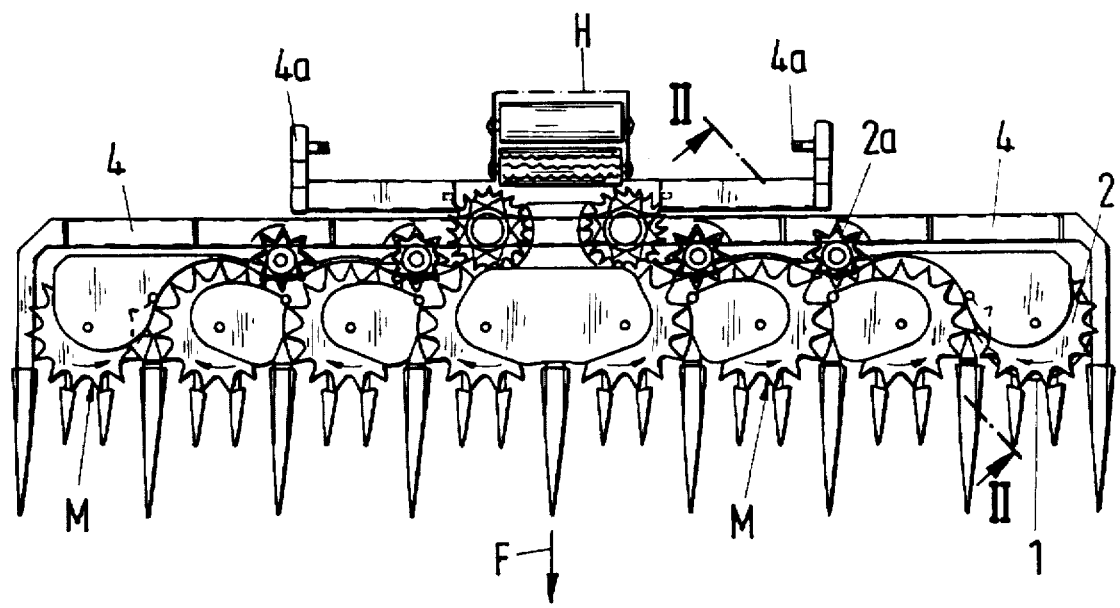
FIG. 1 shows a plan view of a mowing machine with a total of eight mowing apparatuses which, pursuant to the invention, are equipped with a braking device.
Figure 2:
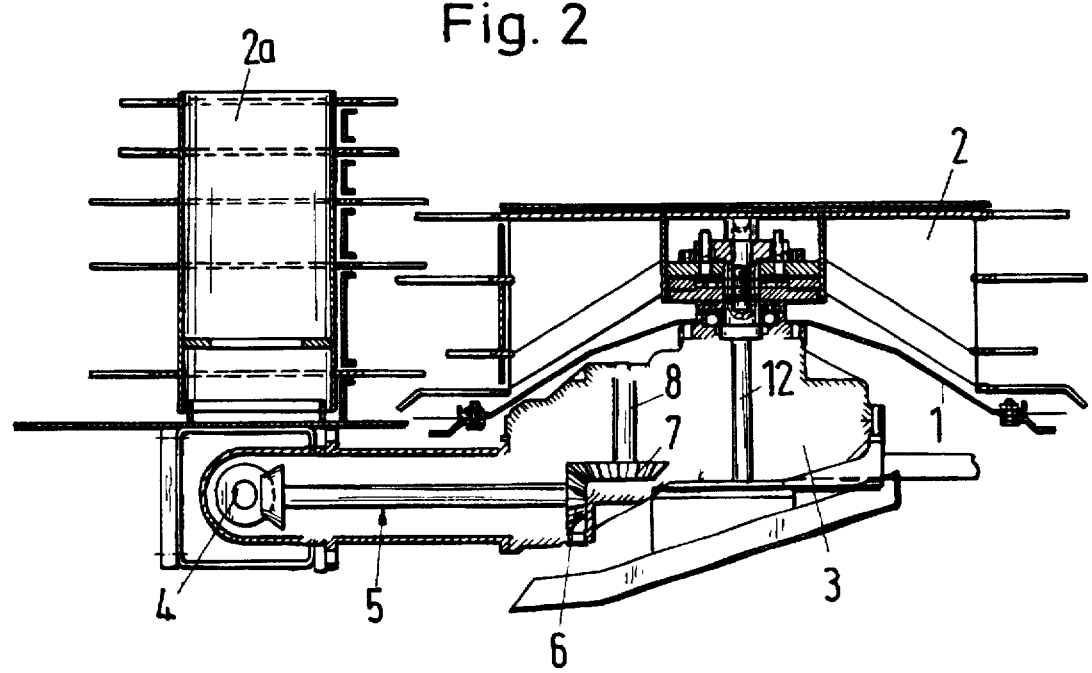
FIG. 2 shows a section along the line II—II of FIG. 1.

The mowing machine, shown in FIG. 1 and advanced in the direction of arrow F, is constructed in the example shown as an attachment for a tractor and comprises, as an example, a total of eight mowing apparatuses M, of which four are disposed on the one and four on the other side of a vertical central plane of the machine. In the driving direction F, the mowing apparatuses M are disposed ahead of a chopper H, which is indicated only by its insertion rollers, which are disposed ahead. In the case of the example shown, the chopper H, together with the mowing apparatus M, forms a harvester unit, for example, a so-called corn mower-chopper.

Each mowing apparatus M has a revolving mowing implement 1 in the form of a circular knife or a so-called serrated rotor and, in the case of the type of machine shown, is combined with a slowly running drawing-in drum 2. In addition, transverse conveying drums 2a are provided to convey the cut harvested crops transversely to the chopper H.

The mowing implement 1, as well as the drawing-in drum 2 are driven over a transmission 3 by a main drive shaft 4 over a miter gear 5 with terminal, mutually meshing miter wheels 6 and 7 on a vertical drive shaft 8. On either side of the vertical, longitudinal central plane of the machine, a horizontal main drive shaft 4 is connected over a spur gearing 4a with the central transmission of the chopper H, from which it receives its motive power.

The transmission 3, with additional details together with its transmission housing 3a, is shown in FIG. 3. Seated on the vertical shaft 8 above the miter wheel 7 of the miter gear 5, there is a small gearwheel 9 and a freewheel mechanism 10, which in turn is connected with the shaft 8 so that there can be no mutual rotation The gearwheel 9 meshes with a gearwheel 11 on a shaft 12 as driving shaft for the drawing-in drum 2, which is fastened to the upper end of the shaft 12. On the freewheel mechanism 10, a further gearwheel 14 of large diameter is seated, which meshes with a gearwheel 15 of small diameter for driving the mowing implement 1 rapidly. The gearwheel 15 is seated on a hollow shaft 13 with a flange 13a at its upper end for attachment to the mowing implement 1.

At uniform angular distances on the horizontal ring disk 10a of the freewheel mechanism 10, three driving pins 16 are disposed, which have a lower projection 16a of decreased diameter and interact with a locking disk 17, which is placed on the ring disk 10a. The locking disk 17 is fixed to the gearwheel 14 so that it can swivel by about 15°. For this purpose, a bolt 17a is screwed from below into the gearwheel 14 and engages an elongated hole 17b of appropriate length, which is curved in the peripheral direction of the locking disk 17. In their driving connection with their freewheel mechanism 10, the driving pins 16, as can be seen particularly in FIG. 5, engage with their lower projections 16a three curved paths 18 at the lowest end point 18a of the latter. The curved paths 18 are disposed at appropriate angular distances in the ring disk 10a and are provided on the bottom with ramps 18b. At their end opposite to end 18a, the ramps 18b end on the surface of the ring disk 10a.

The direction of rotation of the freewheel mechanism 10 in the state, in which it is driven by the main drive shaft 4 over the miter gear 5, is indicated in FIG. 4 by arrow A. If the motive power is interrupted and, with that, the freewheel mechanism 10 is stopped, the direction of rotation of the mowing implement 1, running on because of its centrifugal mass, is indicated by arrow B. If the mowing implement 1, with the driving parts connected to it, runs on in the direction of arrow B when the freewheel mechanism 10 is stopped, the three driving pins or cams 16 migrate in their curved paths 18 on the ramps 18b upwards onto the surface of the ring disk 10a. However, each of them is caught on the underside in a locking groove 19 of the locking disk 17.

The locking grooves 19 are disposed at appropriate angular distances as slots on the locking disk 17. Each locking groove 19 has an expanded part 20 which, as seen in FIG. 5, can accommodate the driving pin 16, and an adjoining contracted part 21, into which the projection 16a of the driving pin 16 is pushed The projection 16a, in conjunction with the elongated hole contraction 21, causes the respective driving pin 16 to be locked in its raised position, as can be seen especially in FIG. 7. This running-on rotational movement is made possible moreover in a known manner by a needle bearing 10b, indicated in FIGS. 5 to 8 between the vertical parts of the freewheel mechanism 10 and the adjoining inner peripheral surface of the gearwheel 14.

With the lifting motion of the driving pin 16 from the driving position of FIG. 5 into the raised position of FIG. 7, an annular pressure plate 22, which lies against the upper side of the driving pins 16 and is connected with the gearwheel 14 so that there can be axial motion but no mutual rotational motion, is raised. The pressure plate 22 is equipped with three shift pins 23, which are distributed at uniform angular intervals and each of which is constantly tensioned against the pressure plate 22 by a compression spring 24. As the pressure plate 22 is raised by the driving pin 16, the shift pins 23 come into driving engagement with a driving ring 25, in that they enter elongated holes 26, which are arc-shaped in the peripheral direction and incorporated into the underside of the driving ring 25. During the running-on motion of the running-on parts of the transmission in the direction of arrow B, the shift pins 23 come to rest at the end of the elongated holes 26. This operating position can be seen particularly in FIGS. 7 and 8, in which the running-on gearwheel 14 is coupled to the driving ring 25 by the shift pins 23. In FIGS. 6 and 8, the shift pins 23 are partially shown in section, so that the compression spring 24, accommodated in an inner cavity of the shift pin 23, and its underside support on the locking disk 17 are shown.

In the Example shown, the braking device comprises an annular braking disk 27 of a wear-resistant material, which is suitable for this purpose. At its inner peripheral edge, the braking disk 27 is firmly connected with the outer peripheral edge of the driving ring 25 by meshing denticulation. Moreover, the braking device comprises two brake counter-disks 28 and 29, between which a horizontal annular gap is left. The brake counter-disks 28 and 29 are bolted to an upper part 30 of the transmission housing 3a by fastening bolts 31 over spacer bushings 32, which avoid tilting, with formation of the annular gap accommodating the braking disk 27. The bolting is accomplished over spring washers 33, which are placed around the bushings 32 and make possible an elastic adjustment of the gap width and, with that, of the braking torque corresponding to the centrifugal mass determined by the mowing implement 1. The narrower the annular gap, formed between the brake counter-disks 28 and 29, the greater is the braking effect exerted on the braking disk 23 passing through the annular gap.

Loosening the brake by lowering the pressure plate 22 takes place automatically when the main driving mechanism is started up again, that is, in the case of the Examples shown, when the gas pedal is depressed from the tractor, with the result that the shaft 8 and, with that, the freewheel mechanism 10 are driven in the direction of arrow A over shaft 4 and miter gear 5. By friction between the locking disk 17 and the ring disk 10a of the freewheel mechanism 10, the locking disk 17 is driven in the direction A, as a result of which the driving pin 16 is passed out of the constriction 21 of the locking grooves 19 back into the expanded groove part 20. The driving pins 16 fall through the expanded groove part 20 downward into the respective curved path 18 and slide in this on the ramp 18b downward up to the end 18a of the groove, so that the mowing implement 1 is driven once again in the direction indicated by arrow A by the positive engagement between the driving pin 16 and the freewheel mechanism 10.

The downwards motion of the driving pins 16 with the pressure plate 22 is supported by the return-motion springs 34, which are accommodated in the boreholes 14a of the gearwheel 14. In the case of the Examples shown, three boreholes 14a, disposed at uniform angular intervals from one another, are provided in the gearwheel 14. The compression springs 34 are supported at their upper end at a ring projection of the gearwheel 14, directed towards the interior of the boreholes, and, at their lower end, at an appropriate projection of a bushing 35, which projection is directed towards the exterior of the boreholes. The bushing 35 is inserted in the borehole 14a and, in this way, forms an annular gap with the internal periphery of the borehole 14a to accommodate the return-motion spring 34. The gearwheel 14 is connected over the bushings 35 with the pressure plate 22 in each case by a screw 36, which extends through the bushing 35 and is screwed into the pressure plate 22, the bushings 35 being held axially movable in their boreholes 14a. Opposite the boreholes 14a, boreholes 37, which are elongated relative to the circular boreholes 14a at both ends in the circumferential direction corresponding to the rotational movement clearance of about 15° of the locking disk 17, are incorporated in the locking disk 17.

In the driving position of the driving pins 16, which can be seen particularly in FIG. 5, the bushings 35 lie with their lower ends in the boreholes 37 of the locking disk 17 and, with their upper ends, in a plane, which is shared with the upper horizontal annular surface of the gearwheel 14 and in which also the pressure plate 22 lies in this operating state. In the case of the above-described lifting motion of the driving pins 16, in which motion the pressure plate 22 is carried along, the bushings 35, with compression of the return-motion spring 34, are moved upward into the position shown in FIG. 7. During the downwards motion of the driving pins 16, the tension on the return-motion springs 34 is relieved and these springs 34 lead the pressure plate 22 back into the position shown in FIG. 5. At the same time also, the shift pins 23 are pulled out of the elongated holes 26 of the drive ring 25. The braking device thus is inoperative.

The transmission 3, encased in a housing 3a, is lubricated by a fluid, a friction bearing 38 being provided between the upper part 30 of the housing and the drive ring 25.

What we claim is:

1. A mowing apparatus for driving a mowing implement rotatable about a vertical axis, said mowing apparatus comprising a housing, a drive shaft rotatable in said housing, a rotatable implement drive member in said housing and operable to effect rotation of said mowing implement, a freewheel means in said housing, said freewheel means including a freewheel ring element mounted on said drive shaft to preclude relative rotary movement between said drive shaft and said freewheel ring element, said freewheel means further comprising a movable drive means moveable between a connect position providing a driving connection between said freewheel ring element and said implement drive member and a disconnect position which disconnects the driving connection between said implement drive member and said freewheel ring element upon stoppage of said drive shaft, said moveable drive means being in a lowered position when in said connect position and in a lifted position when in said disconnect position, said freewheel ring element being operable to lift said moveable drive means from said lowered position to said lifted position, and braking means activated when said movable drive means is in said disconnect position for braking rotation of said implement drive member.

2. A mowing apparatus according to claim 1 wherein said moveable drive means comprises a plurality of pin elements and a pressure plate overlying said pin elements, said pressure plate being lifted by said pin elements to effect operation of said braking means when said pin elements move from said lowered position to said lifted position.

3. A mowing apparatus according to claim 2 wherein said freewheel means comprises biasing means biasing said pressure plate and said pin elements toward said lowered position.

4. A mowing apparatus for driving a mowing implement rotatable about a vertical axis, said mowing apparatus comprising a housing, a drive shaft rotatable in said housing, a rotatable implement drive member in said housing and operable to effect rotation of said mowing implement, a freewheel means in said housing, said freewheel means including a freewheel ring element mounted on said drive shaft to preclude relative rotary movement between said drive shaft and said freewheel ring element, said freewheel means further comprising a moveable drive means moveable between a connect position providing a driving connection between said freewheel ring element and said implement drive member and a disconnect position which disconnects the driving connection between said implement drive member and said freewheel ring element upon stoppage of said drive shaft, said movable drive means comprising a plurality of pin elements having pin axes parallel to the axis of rotation of said drive shaft, and braking means activated when said movable drive means is in said disconnect position for braking rotation of said implement drive member, said braking means comprising an annular horizontal braking disc and a braking support element connected to said braking disc, said freewheel means comprising coupling means operable to effect coupling between said disc support element and said pin elements when said moveable drive means is in said lifted position.

5. A mowing apparatus according to claim 4 wherein said coupling means comprises shifting pins having generally vertically disposed axes, said braking support element having grooves, said shifting pins being received in said grooves when said moveable drive means is in said disconnect position.

6. A mowing apparatus according to claim 5 wherein said grooves are elongated grooves disposed along portions of a circle.

7. A mowing apparatus according to claim 5 wherein said coupling means comprises biasing means biasing said shifting pins toward said braking means.

8. A mowing apparatus according to claim 5 wherein said moveable drive means comprises a pressure plate overlying said pin elements, said pressure plate being lifted by said pin elements to effect operation of said braking means when said pin elements move from said lowered position to said lifted position, said shifting pins extending through said pressure plate.

9. A mowing apparatus for driving a mowing implement rotatable about a vertical axis, said mowing apparatus comprising a housing, a drive shaft rotatable in said housing, a rotatable implement drive member in said housing and operable to effect rotation of said mowing implement, a freewheel means in said housing, said freewheel means including a freewheel ring element mounted on said drive shaft to preclude relative rotary movement between said drive shaft and said freewheel ring element, said freewheel means further comprising a movable drive means moveable between a connect position providing a driving connection between said freewheel ring element and said implement drive member and a disconnect position which disconnects the driving connection between said implement drive member and said freewheel ring element upon stoppage of said drive shaft, said movable drive means comprises a plurality of pin elements having pin axes parallel to the axis of rotation of said drive shaft, said freewheel ring element having a horizontal upper side, a locking disc disposed to overlie said horizontal upper side of said freewheel ring element, said locking disc having locking means to lock said pin elements in said lifted disconnect position, and braking means activated when said movable drive means is in said disconnect position for braking rotation of said implement drive member.

10. A mowing apparatus according to claim 9 wherein said locking disc has openings through which said pin elements extend, said openings having a first and second portion, said first portion being larger than said second portion, said pin elements being disposed in said first portion when said pin elements are in said connect position, said pin elements being disposed in said second portion when said pin elements are in said disconnect position.

11. A mowing apparatus according to claim 10 wherein said pin elements have a shoulder engaging said locking disc when said pin elements are disposed in said second portion of said openings, said shoulder however an outer diameter greater than the size of said second portion of said opening such that the engagement between said shoulder and said second portion of said opening is operable to retain said pin elements in said lifted and disconnect position.

12. A mowing apparatus according to claim 9 further comprising limiting means limiting the amount of relative rotatable movement between said locking disc and said implement drive member.

13. A mowing apparatus according to claim 12 wherein said limiting means comprises a projection projecting from said implement drive member and a groove in said locking disc receiving said projection.

14. A transmission for driving first and second machine implements comprising a housing, a drive shaft rotatable in said housing, a gear mounted on said drive shaft to preclude relative rotatable movement between said drive shaft and said gear, said gear being operable to effect rotation of said first implement, a rotatable implement drive member in said housing and operable to effect rotation of said second implement, a freewheel means in said housing, said freewheel means including a freewheel ring element mounted on said drive shaft to preclude relative rotary movement between said drive shaft and said freewheel ring element, said freewheel means further comprising moveable drive means moveable between a connect position providing a driving connection between said freewheel ring element and said implement drive member and a disconnect position which disconnects the driving connection between said implement drive member and said freewheel ring element upon stoppage of said drive shaft, and braking means activated when said moveable drive means is in said disconnect position for braking rotation of said implement drive member.

* * * * *